US005630319A

United States Patent [19]

Schilling et al.

[11] Patent Number: 5,630,319

[45] Date of Patent: May 20, 1997

[54] DOME ASSEMBLY FOR A MULTIPLE ANNULAR COMBUSTOR

[75] Inventors: Jan C. Schilling, Middletown; Edward C. Vickers, Cincinnati, both of Ohio

[73] Assignee: General Electric Company, Cincinnati, Ohio

[21] Appl. No.: 440,437

[22] Filed: May 12, 1995

[51] Int. Cl.[6] .......... F02C 1/00

[52] U.S. Cl. .......... 60/747; 60/39.32; 60/756

[58] Field of Search .......... 60/39.31, 39.32, 60/39.36, 733, 752, 753, 756, 757, 747, 748

[56] References Cited

U.S. PATENT DOCUMENTS

| | | | |
|---|---|---|---|
| 3,901,446 | 8/1975 | Petriekis, Jr. et al. | 60/748 |
| 4,162,611 | 7/1979 | Caruel et al. | 60/748 |
| 4,870,818 | 10/1989 | Suliga | 60/756 |
| 4,914,918 | 4/1990 | Sullivan | 60/756 |
| 4,934,145 | 6/1990 | Zeisser | 60/756 |
| 5,197,289 | 3/1993 | Glevicky et al. | 60/746 |
| 5,220,795 | 6/1993 | Dodds et al. | 60/752 |
| 5,285,632 | 2/1994 | Halila | 60/39.31 |
| 5,323,604 | 6/1994 | Ekstedt et al. | 60/39.36 |
| 5,479,772 | 1/1996 | Halila | 60/747 |

*Primary Examiner*—Timothy Thorpe
*Assistant Examiner*—Ted Kim
*Attorney, Agent, or Firm*—Andrew C. Hess; Wayne O. Traynham

[57] ABSTRACT

A dome assembly for a multiple annular combustor is disclosed as including an annular dome plate having at least two radial domes, wherein each of the radial domes include a plurality of circumferentially spaced openings therein. A heat shield is positioned within each of the openings, with a threaded forward end located upstream of the dome plate and an aft end located downstream of the dome plate. A retainer nut with threads formed on an annular surface thereof is matingly engagable with the forward end of each heat shield. When the retainer nut is tightened onto the heat shield forward end, the heat shield is mechanically attached to the dome plate. Preferably, at least one centerbody extends axially downstream from either the radially outer or inner side of the aft end. The dome assembly includes a ferrule within each of the dome plate openings for receiving an air/fuel mixer therein, the ferrule having an annular sealing flange extending radially therefrom. A retaining ring is positioned upstream of the heat shield forward end to produce a gap therebetween. The ferrule sealing flange is positioned within the gap to prevent air from flowing between the heat shield and the air/fuel mixer.

20 Claims, 4 Drawing Sheets

DOME ASSEMBLY FOR A MULTIPLE ANNULAR COMBUSTOR

BACKGROUND OF THE INVENTION

1. Field of the Invention

The present invention relates to a multiple annular combustor for a gas turbine engine and, more particularly, to a dome assembly for a multiple annular combustor where heat shields are mechanically attached to the dome plate.

2. Description of Related Art

It is well known in the art for multiple annular combustors of gas turbine engines to employ heat shields to protect the dome plate from excessive heat. Such heat shields preferably include annular centerbodies extending axially therefrom in order to separate the domes or stages of the combustor. By doing so, combustion stability of the pilot stage is ensured at various operating points and primary dilution air is allowed to be directed into the pilot stage reaction zone.

One particular heat shield and centerbody design utilized with a triple annular combustor is disclosed in U.S. Pat. No. 5,323,604, which is also owned by the assignee of the present invention. As seen therein, the heat shield/centerbody is brazed to the dome structure. While brazing of heat shields and centerbodies to the dome structure of a combustor is commonly employed in the art, it has been found that debrazing and rebrazing a damaged heat shield/centerbody is difficult during repair and requires engine teardown.

Additionally, it will be seen in U.S. Pat. No. 5,323,604 that ferrules are positioned between the forward side of the dome and certain retainer pieces, where the ferrules are able to float radially and circumferentially so as not to load up the fuel nozzle assembly. Accordingly, the fuel nozzle contains a piston ring seal for sealing of the ferrule to the fuel nozzle, while the centerbodies include "C" seals on the outer extremes thereof to prevent leakage as they are cooled. Therefore, a large number of components are utilized and must be assembled, which can become extremely difficult.

Further, it will be understood that the centerbodies in U.S. Pat. No. 5,323,604 must be preloaded to compress the "C" seal and tack welded in place, whereupon they are brazed for final attachment along with the retainers for the ferrules. It has been found that inspection of this assembly for full joint penetration is impossible, therefore bringing the total joint integrity into question.

In light of the foregoing, it would be desirable to have a heat shield and centerbody assembly which can be attached to a dome structure of a multiple annular combustor that does not have the associated problems of brazing, and yet still provides the sealing required to prevent air from entering the combustion zone.

SUMMARY OF THE INVENTION

In accordance with one aspect of the present invention, a dome assembly for a multiple annular combustor is disclosed as including an annular dome plate having at least two radial domes, wherein each of the radial domes includes a plurality of circumferentially spaced openings therein. A heat shield is positioned within each of the openings, with a threaded forward end located upstream of the dome plate and an aft end located downstream of the dome plate. A retainer nut with threads formed on an inner annular surface thereof is matingly engagable with the forward end of each heat shield. When the retainer nut is tightened onto the heat shield forward end, the heat shield is mechanically attached to the dome plate. Depending upon dome location, it is preferred that at least one centerbody extends axially downstream from either the radially outer or radially inner side of the heat shield aft end.

A second aspect of the present invention is that the dome assembly includes a ferrule within each of the dome plate openings for receiving an air/fuel mixer therein, the ferrule having an annular sealing flange extending radially therefrom. A retaining ring is positioned upstream of the heat shield forward end to produce a gap therebetween. Accordingly, the ferrule sealing flange is positioned within the gap to prevent air from flowing between the heat shield and the air/fuel mixer.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
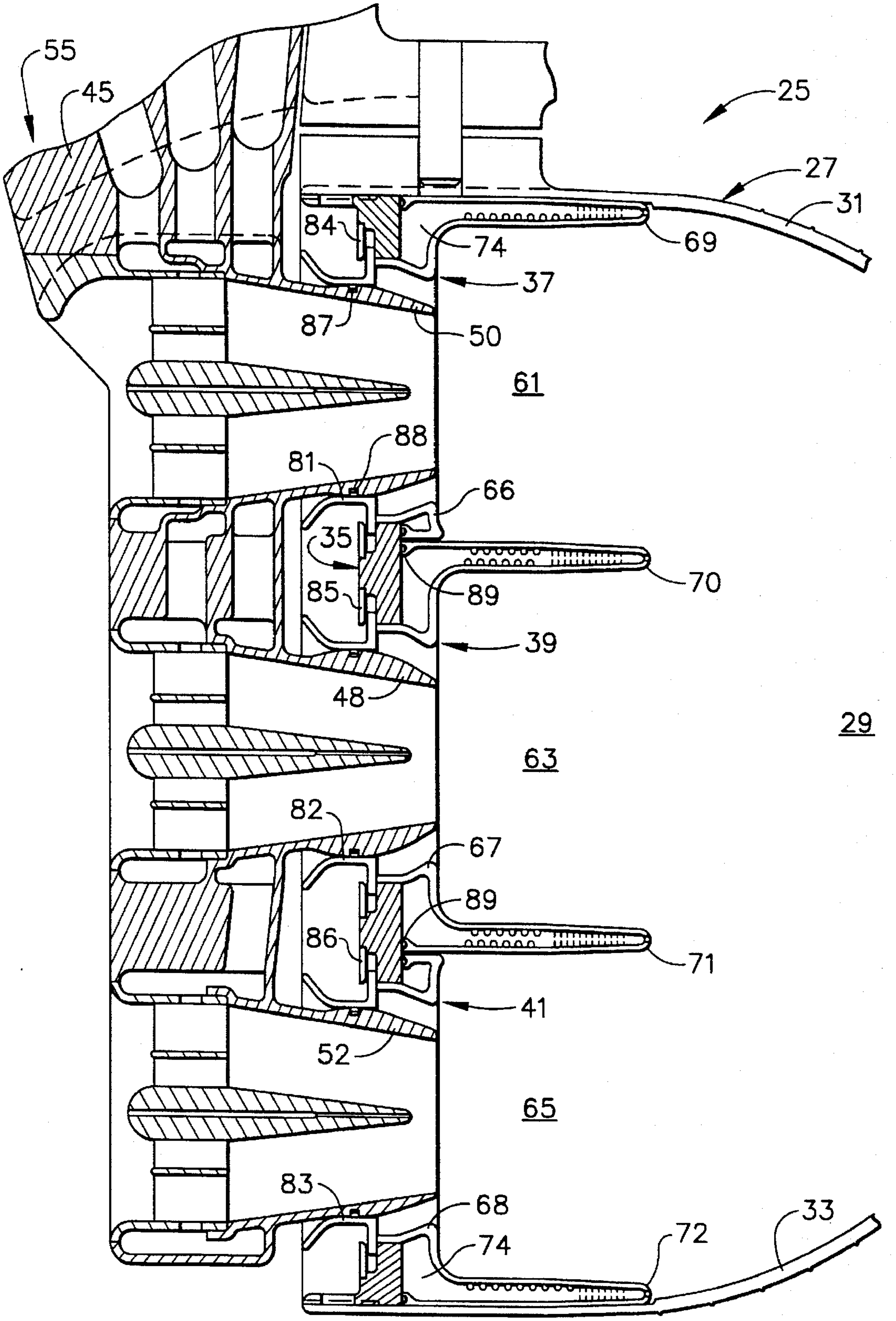
FIG. 1 (PRIOR ART)
FIG. 1 is a partial, cross-sectional schematic view of a prior art triple annular combustor as disclosed in U.S. Pat. No. 5,323,604, where a prior art dome assembly is depicted.

Referring now to the drawing in detail, wherein identical numerals indicate the same elements throughout the figures, FIG. 1 depicts a multiple annular combustion apparatus 25 in accordance with U.S. Pat. No. 5,323,604, which is hereby incorporated by reference. It will be understood that combustion apparatus 25 has a hollow body 27 defining a combustion chamber 29 therein. Hollow body 27 is generally annular in form and is comprised of an outer liner 31, an inner liner 33, and a domed end or dome plate 35. In this annular configuration, domed end 35 of hollow body 27 includes three separate radial domes—outer dome 37, middle dome 39, and inner dome 41. It will be understood that outer dome 37 includes an outer end which is fixedly joined to outer liner 31 and an inner end spaced radially inward from the outer end. Middle dome 39 has an outer end fixedly joined to the outer dome inner end and an inner end spaced radially inward from the middle dome outer end. Inner dome 41 includes an outer end fixedly joined to the middle dome inner end and an inner end spaced radially inward from the inner dome outer end which is fixedly joined to inner liner 33. Combustor 25 is conventionally mounted to the engine casing (not shown) by means of dome plate 35. Each of domes 37, 39 and 41 include therein a plurality of circumferentially spaced openings for receiving mixers for mixing air and fuel prior to entry into combustion chamber 29. Since combustion apparatus 25 is predicated on an extremely well mixed flame, air/fuel mixers are preferably in accordance with that disclosed in U.S. Pat. No. 5,351,477, entitled "Dual Fuel Mixer for Gas Turbine Combustor," which is also owned by the assignee of the present invention and is hereby incorporated by reference.

As described in U.S. Pat. No. 5,323,604, heat shields 66, 67, and 68 (see FIG. 1) are provided with centerbodies 69, 70, 71 and 72 to segregate the individual primary combustor zones 61, 63, and 65, respectively. Heat shields 66, 67, and 68 are connected to the openings in domes 37, 39 and 41, respectively, by means of brazing adjacent the downstream portion of mixers 50, 48, and 52. Accordingly, the openings in outer dome 37 include heat shields 66 therein, which have annular centerbody 69 to insulate outer liner 31 from flames burning in primary zone 61. The openings in middle dome 39 include heat shields 67 therein, which have annular centerbodies 70 and 71 to segregate middle dome 39 from outer dome 37 and inner dome 41, respectively. The openings in inner dome 41 include heat shields 68, which have annular centerbody 72 to insulate inner liner 33 from flames burning in primary zone 65.

In order to prevent cooling air supplied to dome plate 35 from leaking between the openings in domes 37, 39 and 41 and mixers 48, 50 and 52, respectively, and into primary combustion zones 61, 63, and 65, a series of sealing measures is provided. More specifically, mixers 50, 48 and 52 are held within ferrules 81, 82 and 83, which in turn are held in position by ferrule retainers 84, 85, and 86, respectively. This arrangement allows circumferential and radial movement of ferrules 81, 82, and 83 to relieve thermal growth differential between dome plate 35 and mixers 50, 48, and 52. In order to prevent cooling air from leaking into primary combustion zones 63, 61 and 65, a seal 87 is placed within a notch 88 in the outer wall of each mixer. Another set of seals 89 is provided at the junction of heat shields 66, 67, and 68 and dome plate 35. Seals 89 act to seal impingement cavity 74 of annular centerbodies 69, 70, 71 and 72 from primary combustion zones 61, 63 and 65, as well as permit thermal movement between heat shields 66, 67 and 68 and domes 37, 39 and 41.

In accordance with the present invention, as seen in FIGS. 2-5A, a plurality of outer heat shields 166, middle heat shields 167 and inner heat shields 168 and their corresponding centerbodies 169, 170, 171 and 172 have been reconfigured from those in U.S. Pat. No. 5,323,604 in order to mechanically attach to dome plate 35 instead of being brazed thereto. By doing so, the assembly and disassembly process has been simplified. Further, a distinctive sealing arrangement is associated with this mechanical attachment of heat shields 166, 167 and 168 to dome plate 35, whereby cooling air is prevented from entering primary combustion zones 61, 63 and 65 between heat shields 166, 167 and 168 and air/fuel mixers 48, 50 and 52, respectively.

Figure 2:
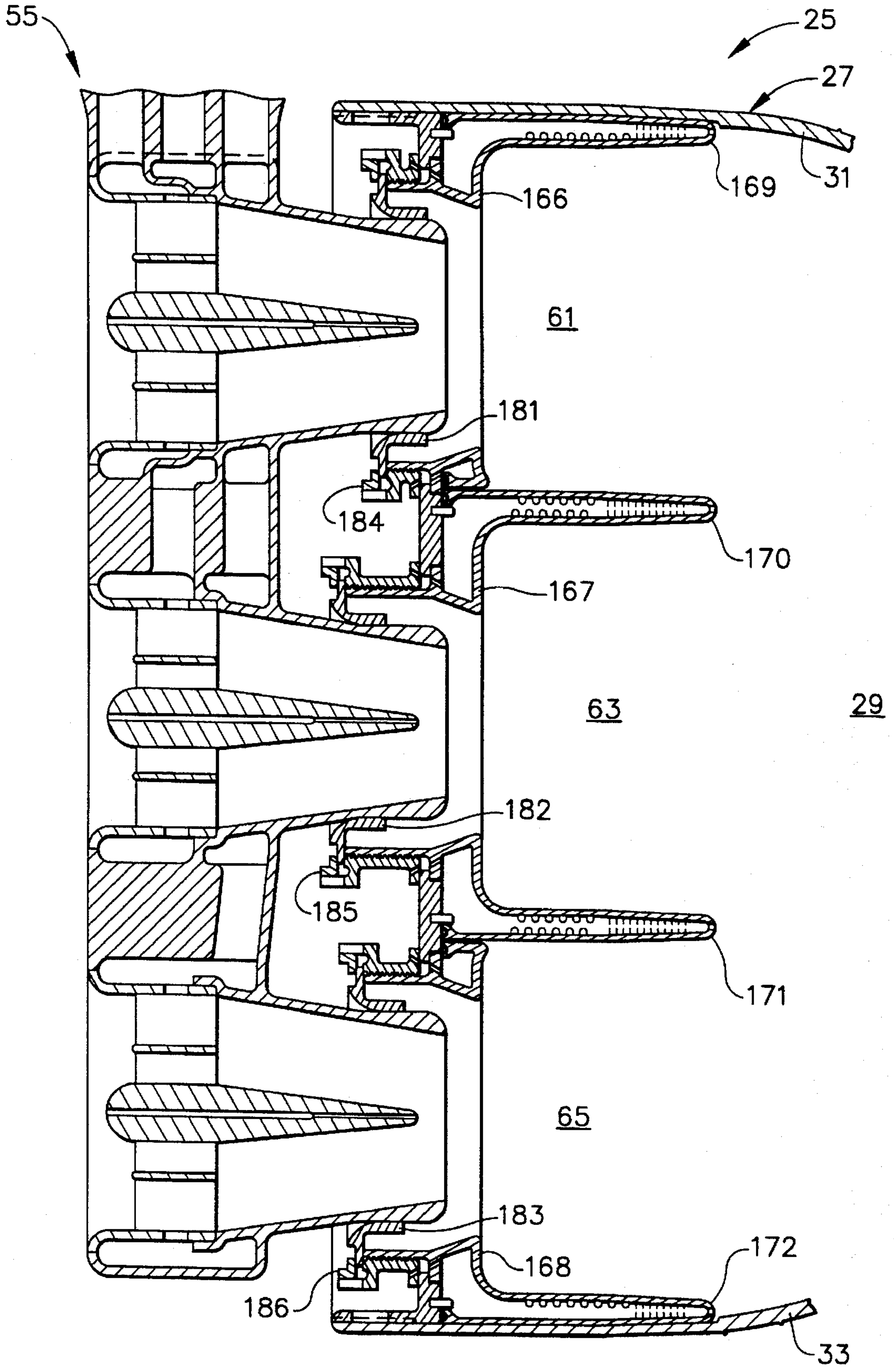
FIG. 2 is a partial, cross-sectional schematic view of a triple annular combustor including the dome assembly of the present invention.
Figure 3:
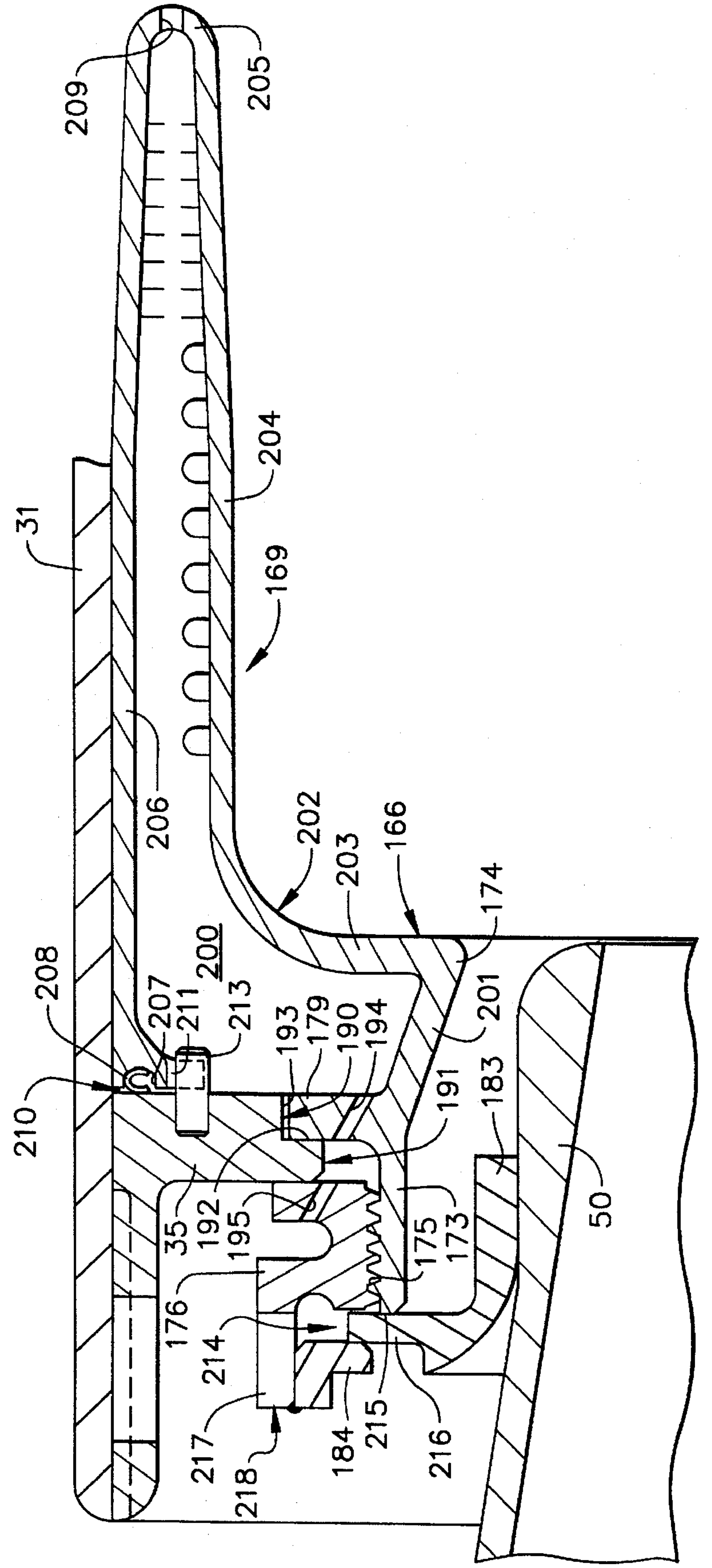
FIG. 3 is an enlarged, partial cross-sectional schematic view of the dome assembly depicted in FIG. 2.

More specifically, as seen in FIGS. 2 and 3, heat shields 166, 167, and 168 have a forward end located upstream of dome plate 35 (identified by the numeral 173 with respect to outer heat shield 166 in FIG. 3) and an aft end located downstream of dome plate 35 (identified by the numeral 174 with respect to outer heat shield 166 in FIG. 3). Preferably, forward end 173 will be substantially annular in axial cross-section and aft end 174 will be substantially square in axial cross-section. It will be noted that forward end 173 includes threads 175 formed thereon. In order to mechanically attach heat shields 166, 167 and 168 to dome plate 35, a plurality of retainer nuts 176 having threads 177 formed in an inner annular surface 178 thereof (see FIG. 5A) is provided, whereby each retainer nut 176 is matingly engagable with each one of heat shields 166, 168 and 168.

Moreover, it will be best seen in FIG. 3 that heat shields 166, 167 and 168 each include an annular flange 179 extending radially outward therefrom. Flange 179 is preferably located approximately midway between forward end 173 and aft end 174 of heat shields 166, 167 and 168. An annular groove 190 preferably is formed in an inner annular surface 191 defining the openings within dome plate 35. It will be seen in FIG. 3 that annular groove 190 thereby provides a shoulder having an aft facing surface 192 and a radially inward facing surface 193. Accordingly, when annular flange 179 of heat shields 166, 167 and 168 are positioned within groove 190, it allows them to work against dome plate 35 when retainer nut 176 is tightened thereon.

It will also be noted that a cooling hole 194 is provided within annular flange 179 and a corresponding cooling hole 195 is provided within retainer nut 176. In this way, cooling air is able to flow through cooling holes 194 and 195 to the interior 200 of a centerbody located to one radial side of aft end 174. As seen in FIG. 3, heat shield 166 includes centerbody 169 positioned to the radially outward side thereof. In this way, centerbody 169 is able to insulate outer liner 31. However, it will be seen that centerbody 172 of heat shield 168 is located to the radially inward side thereof in order to insulate inner liner 33. Finally, as seen in FIG. 2, heat shield 167 includes centerbody 170 positioned at its radially outward side and centerbody 171 positioned at its radially inward side in order to better segregate the pilot combustion zone 63 from outer primary zone 61 and inner primary combustion zone 65, respectively.

It will be understood that centerbodies 169–172 will have a design similar to that shown and described in U.S. Pat. No. 5,323,604. However, as seen in FIGS. 2 and 3, centerbody 166 is depicted as being hollow with an interior space 200 defined by dome plate 35, annular flange 179 of heat shield 166, a transition area 201 of heat shield 166 between annular flange 179 and aft end 174, and a non-linear wall 202. It will be seen that non-linear wall 202 includes a first portion 203 extending radially from heat shield aft end 174, a second portion 204 extending axially downstream away from dome plate 35, a third portion 205 again extending radially from second portion 204, and a fourth portion 206 extending axially upstream terminating adjacent dome plate 35. As seen with heat shield 166, non-linear wall 202 extends radially outward in first portion 203 and third portion 205. However, with respect to centerbodies 171 and 172 which are located on the inner radial portion of heat shields 167 and 168, respectively, the first and third portions of the non-linear walls thereof extend radially inward. Thus, apart from whether non-linear wall 202 extends radially outward or radially inward, centerbodies 169–172 are generally of the same construction.

It will also be noted that a notch 207 is incorporated into an upstream surface of centerbody fourth portion 206 adjacent dome plate 35. Notch 207 preferably includes a seal 208 therein, such as a "C" seal or other similar device. This is to prevent the cooling air entering centerbody interior 200 from escaping at the upstream end of centerbodies 169–172. Rather, it is intended for the cooling air to exit through a passage 209 at the downstream end of centerbodies 169–172. In this way, the cooling air exits downstream of the primary combustion zones 61, 63, and 65 and therefore does not affect the $NO_x$ produced therein. Further, it will be noted that a predetermined gap 210 is provided between dome plate 35 and centerbody fourth portion 206 in order to prevent crushing of seal 208.

Figure 4:
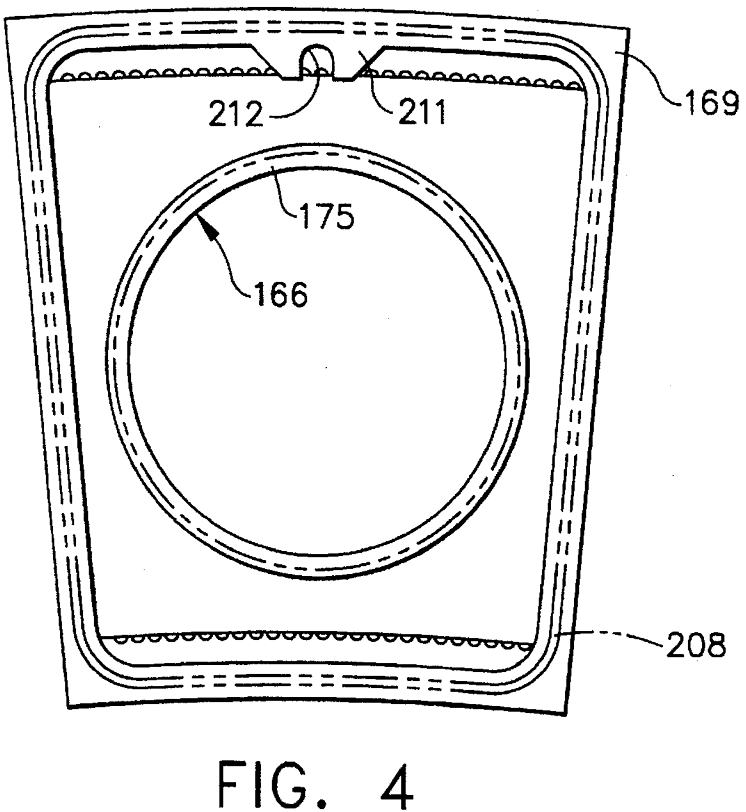
FIG. 4 is a partial, forward looking aft view of the dome assembly of the present invention taken along line 4—4 in FIG. 2.

As seen in FIGS. 3 and 4, a flange 211 preferably extends radially from centerbody fourth portion 206. A notch 212 is provided in flange 211 in order that a pin 213 may be inserted therethrough into dome plate 35 (see FIG. 3). This construction is provided to prevent centerbodies 169–172 from rotating due to torque loads imposed thereon during engine operation. It will be noted that flange 211, while extending radially inward in centerbody 169, will preferably extend radially toward interior 200 of each centerbody. Accordingly, flange 211 will extend radially inward from fourth portions 206 of centerbodies 169 and 170, whereas flange 211 will extend radially outward for centerbodies 171 and 172.

It should also be noted that the construction of the ferrules and ferrule retainers for the present invention will differ from U.S. Pat. No. 5,323,604. In this regard, ferrules 181, 182, and 183 are provided within the openings of the respective domes for the insertion of outer dome mixer 50, middle dome mixer 48, and inner dome mixer 52. Retaining rings 184, 185, and 186 are provided for retaining outer ferrule 181, middle ferrule 182, and inner ferrule 183 in position so as to abut heat shields 166, 167, and 168, respectively. This is accomplished by attaching retaining rings 184, 185, and 186 to retainer nuts 176 by means of a spot weld or other similar means. In doing so, a gap 214 is preferably produced between retaining rings 184, 185, and 186 and upstream surface 215 of heat shields 166, 167, and 168. A sealing flange 216 extends radially outward from outer ferrule 181, middle ferrule 182, and inner ferrule 183 which is positioned within gap 214 between the respective retaining rings and heat shield upstream surface 215. It will be understood that ferrule sealing flange 216 permits outer ferrule 181, middle ferrule 182, and inner ferrule 183 to move circumferentially and radially within gap 214, while preventing it from moving axially.

It will be noted in FIG. 2 that gaps 214 associated with heat shields 166, 167, and 168 and their respective retaining rings 184, 185, and 186 are preferably in varying axial positions. This is done to assist in the insertion of mixers 50, 48, and 52 within ferrules 181, 182, and 183 since mixers 50, 48 and 52 are of an integral structure 55 with manifold system 45 as shown and described in U.S. Pat. No. 5,232,604. Accordingly, ferrule sealing flange 211 for the respective ferrules will be located at varying axial positions so as to be properly inserted for the respective gap. It will also be noted that retainer nuts 176 for the heat shields of each dome may have a different axial length in order to accommodate the varying axial positions of the gaps and sealing flanges.

Figure 5:
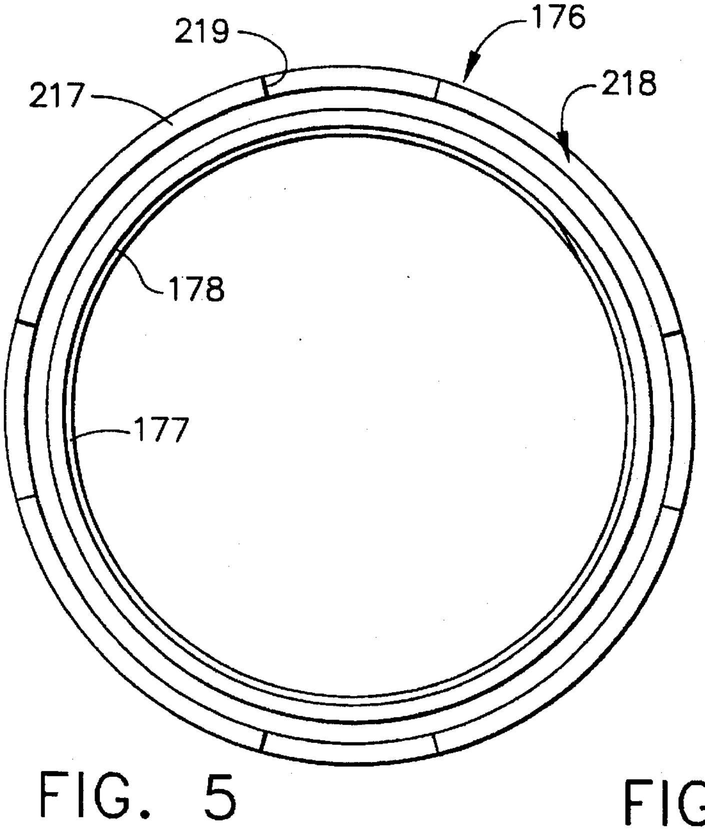
FIG. 5 is a front view of a retainer nut for the dome assembly depicted in FIGS. 2–4.
Figure 5A:
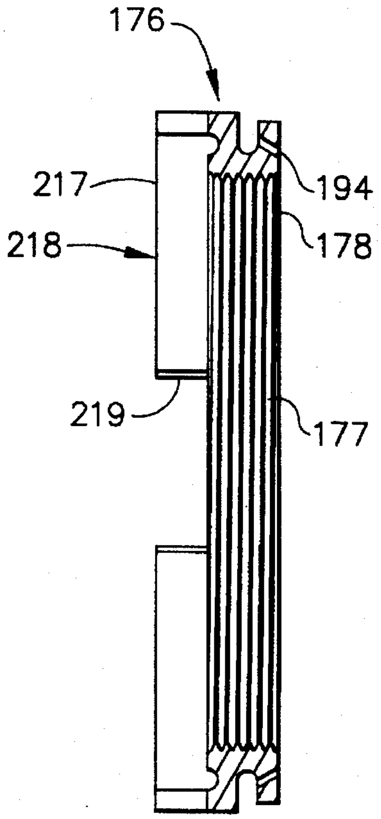
FIG. 5A is a cross-sectional view of the retainer nut depicted in FIG. 5 taken along line 5A—5A.

With respect to retainer nut 176, it will be seen from FIGS. 5 and 5A that a plurality of lugs 217 are incorporated in a portion 218 thereof which is upstream of threads 177. Lugs 217 have slots 219 provided therebetween so that a wrench or other tool may be utilized to engage and disengage retainer nut 176 to and from heat shields 166, 167, and 168.

Having shown and described the preferred embodiment of the present invention, further adaptations of the dome assembly can be accomplished by appropriate modifications by of ordinary skill in the art without departing from the scope of the invention.

What is claimed is:

1. A dome assembly for a multiple annular combustor, comprising (a) an annular dome plate having at least two radial domes, each of said radial domes including a plurality of circumferential openings therein;

(b) a heat shield positioned within each of said openings, said heat shield having a forward end located upstream of said dome plate and an aft end located downstream of said dome plate, wherein said forward end of said heat shield has threads formed thereon; and (c) a retainer nut having an inner annular surface with threads formed thereon, said retainer nut threads being matingly engagable with said heat shield threads;

wherein said heat shield is mechanically attached to said dome plate by said retainer nut.

2. The dome assembly of claim 1, further comprising:

(a) an annular flange extending radially outward from said heat shield, said flange being located downstream of said threaded forward end; and (b) an annular groove formed in an inner annular surface defining said dome plate opening;

wherein said heat shield flange rests within said groove and causes said heat shield to be drawn to a desired fit with said dome plate as said retainer nut is tightened on said heat shield forward end.

3. The dome assembly of claim 2, said heat shield further comprising a hollow centerbody extending axially downstream from one of a radially inner and outer side of said aft end.

4. The dome assembly of claim 3, further comprising cooling passages formed in said retaining nut and said heat shield flange, wherein air flowing to said dome plate is able to flow through said cooling passages and communicate with the interior of said centerbody.

5. The dome assembly of claim 3, said centerbody further comprising a non-linear wall including a first portion extending radially from said heat shield aft end, a second portion extending axially downstream away from said dome plate, a third portion again extending radially from said second portion, and a fourth portion extending axially upstream terminating adjacent said dome plate.

6. The dome assembly of claim 5, further comprising a notch in an upstream surface of said centerbody fourth portion adjacent said dome plate and a seal therebetween.

7. The dome assembly of claim 6, wherein a predetermined gap between said dome plate and said centerbody fourth portion is provided to prevent crushing of said seal.

8. The dome assembly of claim 5, further comprising:

(a) a flange extending radially from said centerbody fourth portion with a notch therein; and (b) a pin inserted through said flange notch into said dome plate;

wherein said centerbody is prevented from rotating due to torque loads.

9. The dome assembly of claim 1, wherein said heat shield forward end is annular.

10. The dome assembly of claim 1, wherein said heat shield aft end is substantially square.

11. The dome assembly of claim 1, said heat shield further comprising a centerbody extending axially downstream from a radially outer side of said aft end.

12. The dome assembly of claim 11, said heat shield further comprising a centerbody extending axially downstream from a radially inner side of said aft end.

13. The dome assembly of claim 1, said heat shield further comprising a centerbody extending axially downstream from a radially inner side of said aft end.

14. The dome assembly of claim 1, further comprising:

(a) a ferrule within said dome plate opening for receiving an air/fuel mixer therein, said ferrule having an annular sealing flange extending radially therefrom; and (b) a retaining ring positioned upstream of said heat shield forward end to provide a gap therebetween;

wherein said ferrule sealing flange is positioned within said gap so that said ferrule is permitted to move circumferentially and radially therein.

15. The dome assembly of claim 1, said retainer nut further comprising a plurality of lugs and slots at a forward end thereof.

16. A dome assembly for a triple annular combustor of a gas turbine engine, comprising:

(a) an annular dome plate having an outer dome, a middle dome, and an inner dome, each of said domes having a plurality of circumferentially spaced openings therein;

(b) an outer heat shield positioned within each of said outer dome openings;

(c) a middle heat shield positioned within each of said middle dome openings; and (d) an inner heat shield positioned within each of said inner dome openings;

wherein said outer, middle, and inner heat shields each have a threaded forward end located upstream of said dome plate and an aft end located downstream of said dome plate;

(e) an outer retainer nut threadingly engaged with each of said outer heat shield forward ends;

(f) a middle retainer nut threadingly engaged with each of said middle heat shield forward ends; and (g) an inner retainer nut threadingly engaged with each of said inner heat shield forward ends; wherein said outer, middle, and inner heat shields are mechanically attached to said dome plate by said outer, middle, and inner retaining nuts.

17. The dome assembly of claim 16, further comprising:

(a) an outer, middle, and inner ferrule within each of said outer, middle, and inner dome openings, respectively, for receiving air/fuel mixers therein, said outer, middle and inner ferrules each having an annular sealing flange extending radially therefrom; and (b) a retaining ring positioned upstream of each of said outer, middle and inner heat shield forward ends to provide a gap between said retaining rings and said heat shields;

wherein said ferrule flanges are positioned within said gaps so that said outer, middle and inner ferrules are permitted to move circumferentially and radially therein.

18. The dome assembly of claim 17, wherein said ferrule flanges of said outer, middle, and inner ferrules are located at varying axial positions.

19. The dome assembly of claim 18, wherein said outer, middle, and inner heat shields have forward threaded ends of varying axial length and said retainer nuts are of corresponding axial length.

20. The dome assembly of claim 16, said triple annular combustor including an outer liner affixed to a radially outer end of said dome plate and an inner liner affixed to a radially inner end of said dome plate, wherein said outer heat shields include a centerbody extending axially downstream from an outer radial side thereof to insulate said outer liner, said inner heat shields include a centerbody extending axially downstream from an inner radial side thereof to insulate said inner liner, and said middle heat shields include a first centerbody extending axially downstream from an outer radial side thereof to separate said outer and middle domes and a second centerbody extending axially downstream from an inner radial side thereof to separate said middle and inner domes.

* * * * *